United States Patent [19]

Shy

[11] 4,131,261
[45] Dec. 26, 1978

[54] FOLDING MEANS FOR SUPPORTING LEGS OF ROASTER OVEN WITH HIGH STABILITY

[76] Inventor: Min-Ching Shy, 20 Alley 18, La. 109 Hoping St., Yang Ho Town Taipei Hsien, Taiwan

[21] Appl. No.: 837,475

[22] Filed: Sep. 28, 1977

Related U.S. Application Data

[63] Continuation-in-part of Ser. No. 757,054, Jan. 5, 1977, Pat. No. 4,063,703.

[51] Int. Cl.² .......................... F16M 11/32; F24C 15/08
[52] U.S. Cl. ................................. 248/439; 108/132; 126/304 R
[58] Field of Search ........... 126/275 R, 304 A, 304 R, 126/9 R, 38; 248/188.6, 359, 150, 148, 168, 169, 439; 108/130, 132; 182/155

[56] References Cited

U.S. PATENT DOCUMENTS

| 184,508 | 11/1976 | Corban | 108/131 |
|---|---|---|---|
| 718,412 | 1/1903 | Back | 126/304 R |
| 902,245 | 10/1908 | Montgomery | 108/131 |
| 1,138,156 | 5/1915 | Stroud | 108/131 |
| 1,229,432 | 6/1917 | Ferdon | 126/9 R |
| 2,020,503 | 11/1935 | Hanson | 126/304 R |
| 3,610,224 | 10/1971 | Marshall | 126/304 R |
| 3,695,567 | 10/1972 | Weagle | 248/188.6 |

FOREIGN PATENT DOCUMENTS

| 730845 | 5/1932 | France | 85/1 K |
|---|---|---|---|
| 1038940 | 8/1976 | United Kingdom | 248/439 |

Primary Examiner—James T. McCall
Attorney, Agent, or Firm—Karl W. Flocks

[57] ABSTRACT

A folding means for supporting legs of roaster oven with high stability comprises: an oven body, an oven belly extending from the oven bottom, two tongue plates extending from both sides of said belly and two sets of folding means of supporting legs each pivotally connected on two sides of said oven belly. Said folding means of supporting legs comprises an U-shaped frame of which two sides of said U-shaped frame are freely and pivotally connected onto each end of the belly and said U-shaped frame can be parallelly pressed onto said tongue plate and be fixed by a fixing screw on the front portion of said U-shaped frame. Said U-shaped frame and the tongue plate are assembled so as to combine the oven with the extendable supporting legs to form an integrated oven.

5 Claims, 6 Drawing Figures

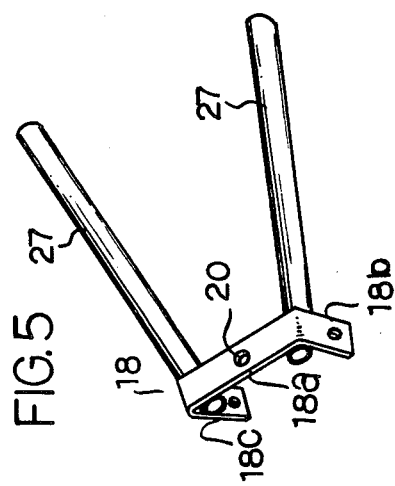
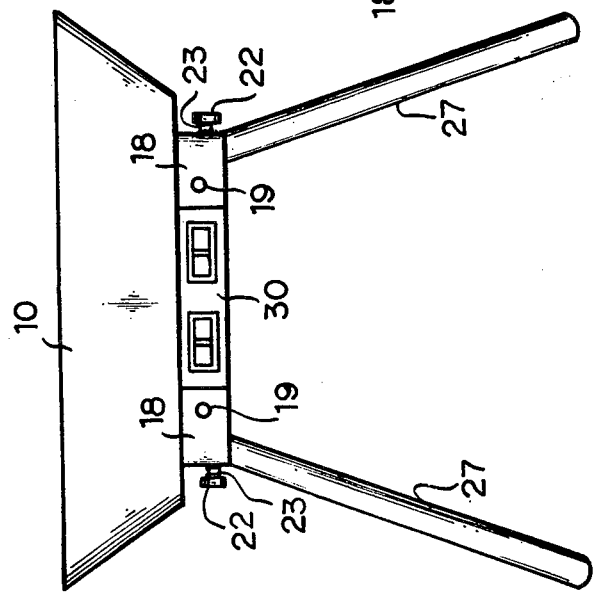

FOLDING MEANS FOR SUPPORTING LEGS OF ROASTER OVEN WITH HIGH STABILITY

This application is a continuation-in-part of U.S. application Ser. No. 757,054 filed on Jan. 5, 1977, now U.S. Pat. No. 4,063,703. The present invention is simpler and more efficient than the prior invention.

BACKGROUND OF THE INVENTION

The present invention relates to a folding means for supporting legs of roaster oven with high stability, particularly to a folding means for supporting oven leg with high stability by which the oven can be firmly integrated with the supporting legs as standing said supporting legs.

SUMMARY OF THE INVENTION

The present invention relates to a folding means for supporting legs of roaster oven having an oven body, an oven belly extending from the oven bottom, two tongue plates extending form both sides of said belly and two sets of folding means of supporting legs each pivotally connected on two sides of said oven belly. Said folding means comprises:

an U-shaped frame, two sides of said U-shaped frame are freely and pivotally connected onto each end of the belly;

a fixing screw provided on the suitable central position of the front portion of U-shaped frame, a rotating button is provided on said screw for rotating forward or backwards;

two supporting legs, of which the upper portion is respectively fixed on both sides of the front portion of the U-shaped frame; and the fixing screw of U-shaped frame which may be adjusted to coincide with the screw hole of the tongue plate for better fixation.

DESCRIPTION OF THE DRAWINGS

FIG. 2 is the front view drawing of FIG. 1.

FIG. 3 is the side view drawing of FIG. 2.

FIG. 5 is the perspective drawing of the folding means for supporting leg of the present invention.

DETAILED DESCRIPTION

As shown in FIG. 1 through FIG. 4, the folding means for supporting legs of roaster oven comprises an oven body 10, an oven belly 30 of oven extending from the bottom of oven body 10 and two sets of foldable means 18 for mounting legs 27 pivotally on opposite ends of the belly 30 at symmetrical position thereof.

Figure 4:
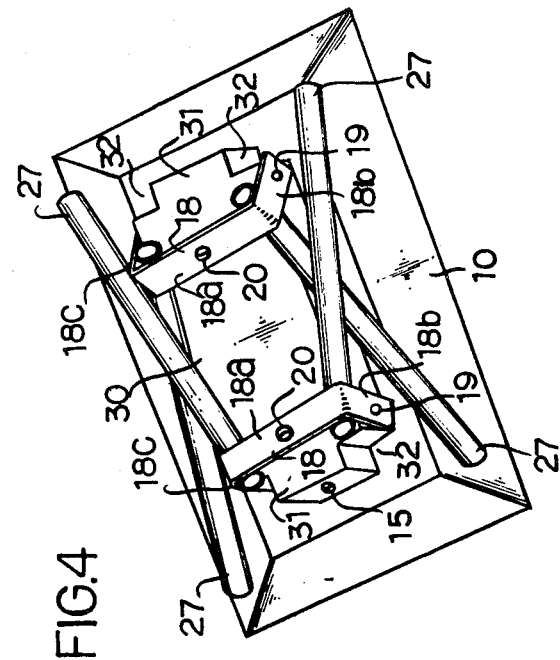
FIG. 4 is the bottom perspective drawing of the folding means when contraction.

As shown in FIG. 4, said belly 30 is extended from the bottom of oven body 10 so as to collect the burned ash. Two tongue portions 31 are respectively extended from opposite ends of the oven belly 30. Each tongue portion is formed with two cutaway corners 32.

As shown in FIGS. 4 and 5, said folding means 18 for supporting legs 27, comprises an U-shaped frame 18. Each of two sides 18b, 18c of a U-shaped frame 18 is pivotally connected adjacent an opposite end of the oven belly 30 respectively through shaft 19.

A screw hole 20 is provided on the central position of an intermediate portion 18a appearing in FIG. 4 as the front side connecting leg portions 18b, 18c of frame 18 which may be moved into registration with the hole 15 of the tongue portion 31 so as to allow a locking or fixing screw 21. A button 22 is provided on one end of said fixing screw 21 for effecting rotation thereof. The screw is formed on another end with a diameter slightly larger than the screw hole 20 so as to secure the screw 21 against coming out of hole 20.

Figure 6:
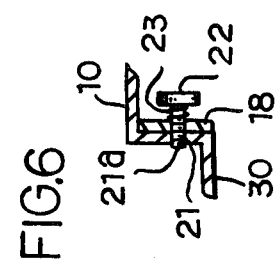
FIG. 6 is the sectional drawing of U-shaped frame fixed on the oven bottom by fixing screw according to the present invention.
Figure 1:
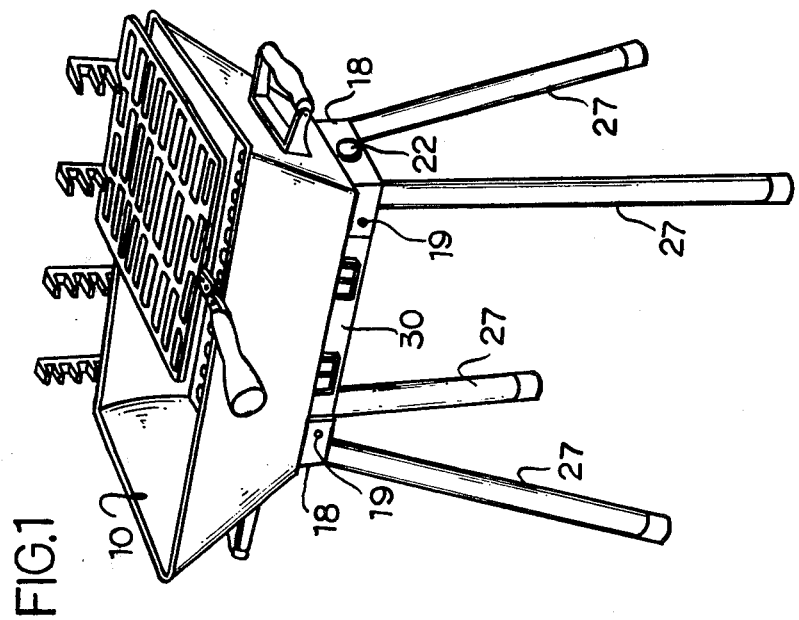
FIG. 1 is the perspective drawing of the folding means for supporting legs of roaster oven having high stability when standing.

The supporting legs 27 of the present invention are provided in two sets. Each set has two supporting legs 27 of which the upper portion are connected inside the front portion 18a of U-shaped frame 18 at opposite ends of portion 18a. Whenever standing the supporting legs, the above-mentioned U-shaped frame 18 of two sets of folding means 18 are parallelly pressed onto the tongue plate 31 of oven belly 30. Then, the front portion 18a of U-shaped frame 18 will be laid and pressed onto the tongue portion 31 of belly 30, the supporting legs 27 will coincide with said cutting corner 32. At the same time, the screw hole 15 of tongue portion 31 is directed to the front end of locking or fixing screw 21. By rotating button 22, the fixing screw 21 may be engaged into screw hole 15 so as to assemble the U-shaped frame 18 with oven belly 30 (as shown in FIG. 6) and accordingly to integrate the oven body 10 with four supporting legs 27. The supporting legs will then become sturdy and have high stability.

Whenever contracting said folding means, release the rotating button 22 to retract the fixing screw 21 from the engaged screw hole 15. Then, the U-shaped frame 18 will be released from the engaged position with tongue portion 31. By folding the supporting legs 27 onto the bottom of oven body 10 as shown in FIG. 4.

Furthermore, a spring 23 is provided on the fixing screw 21 so as to avoid obstructing the operation of U-shaped frame 18 when the supporting legs 27 are unfolded next time. This is because the spring will prevent from forward action of screw 21 by careless operation or accidental force after retracting the screw 21 from hole 15.

I claim:

1. Foldable means for supporting legs of a roaster oven or the like having an oven body, an oven belly extending from said oven body, tongue portions extending from opposite ends of said oven belly, said foldable means including a U-shaped frame pivotally connected on each of said opposite ends of said oven belly, each of said U-shaped frames being pivotally connected to said belly at ends of said side portions of the U-shaped frame located remotely from the intermediate portion of said U-shaped frame connecting the two side portions thereof, said tongue portion having a screw hole for reception of a locking screw provided on said intermediate portion when said frame is adjusted so the said screw is in line with said hole, a button on said screw for effecting rotation thereof and consequently advancement or retraction of said screw, a pair of supporting legs structurally related with each of said U-shaped frames, said structural relationship being characterized in that upper portions of said supporting legs are fixed to said U-shaped frame structurally related thereto at the intersection of the intermediate portion and one of the sides internally of said U-shaped frame whereby said upper portions of said supporting legs will be located between said U-shaped frame and said tongue portion when said legs are placed in standing position to enhance stability thereof.

2. A foldable means for supporting legs of roaster oven according to claim 1 wherein a tongue portion extends from each end of said oven belly and each tongue portion is formed with two cutting corners thereon respectively.

3. A foldable means according to claim 1 wherein said U-shaped frame is freely moved so as to control the folding and extending or standing of said supporting legs.

4. A foldable means according to claim 1 wherein said screw is formed with an end with diameter slightly larger than the screw hole thereof.

5. A foldable means according to claim 1 wherein a spring is provided on said fixing screw.

* * * * *